(12) United States Patent
Lee (10) Patent No.: US 7,577,760 B2
(45) Date of Patent: Aug. 18, 2009

(54) MEMORY SYSTEMS, MODULES, CONTROLLERS AND METHODS USING DEDICATED DATA AND CONTROL BUSSES

(75) Inventor: Jung-Bae Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 256 days.

(21) Appl. No.: 11/267,669

(22) Filed: Nov. 4, 2005

(65) Prior Publication Data
US 2006/0259666 A1 Nov. 16, 2006

(30) Foreign Application Priority Data
May 10, 2005 (KR) .................. 10-2005-0039008

(51) Int. Cl.
G06F 3/00 (2006.01)
G06F 13/00 (2006.01)
G11C 5/06 (2006.01)
G11C 7/00 (2006.01)

(52) U.S. Cl. .................. 710/2; 365/63; 365/189.011; 710/300; 710/305; 711/5; 711/104; 711/170

(58) Field of Classification Search .............. 710/2, 710/300, 305; 365/219, 220, 221; 711/5, 711/104, 170
See application file for complete search history.

(56) References Cited

U.S. PATENT DOCUMENTS

| | | | | |
|---|---|---|---|---|
| 5,357,621 A | * | 10/1994 | Cox | 711/172 |
| 6,421,291 B1 | * | 7/2002 | Watanabe et al. | 365/219 |
| 6,502,161 B1 | * | 12/2002 | Perego et al. | 711/5 |
| 6,553,449 B1 | * | 4/2003 | Dodd et al. | 711/5 |
| 6,662,266 B2 | * | 12/2003 | Ryan | 711/105 |
| 6,772,262 B1 | * | 8/2004 | Park et al. | 710/301 |
| 7,089,412 B2 | * | 8/2006 | Chen | 713/2 |
| 7,269,709 B2 | * | 9/2007 | Kelly | 711/211 |

(Continued)

FOREIGN PATENT DOCUMENTS

JP 2003-271538 9/2003

(Continued)

OTHER PUBLICATIONS

240-Pin 256 MB, 512 MB, 1GB DDR2 SDRAM FBDIMM (SR, FB,x72) Preliminary, Micron Technology, Inc., Boise, ID, 2004, 36 pages.

(Continued)

*Primary Examiner*—Henry W. H. Tsai
*Assistant Examiner*—Michael Sun
(74) *Attorney, Agent, or Firm*—Myers Bigel Sibley & Sajovec, P.A.

(57) ABSTRACT

A memory system includes a plurality of memory devices arranged in sets on at least one memory module, each set including at least one memory device. In some embodiments, the system further includes respective dedicated serial data and control busses configured to couple respective ones of the memory device sets to a memory controller external to the at least one memory module. The dedicated serial data and control busses may be configured to provide unbuffered access to the individual memory devices from the memory controller. In other embodiments, dedicated data busses are provided to an external control buffer and dedicated control busses are provided to a control buffer in the module.

7 Claims, 9 Drawing Sheets

U.S. PATENT DOCUMENTS

2004/0037133 A1* 2/2004 Park et al. ............... 365/202
2004/0105292 A1* 6/2004 Matsui .................... 365/63

FOREIGN PATENT DOCUMENTS

| JP | 2004-139552 | 5/2004 |
| KR | 1020010088376 A | 9/2001 |
| KR | 20030048036 A | 6/2003 |
| KR | 20030085134 A | 11/2003 |
| KR | 1020040062717 A | 7/2004 |

OTHER PUBLICATIONS

Notice of Allowance for Korean Patent Application No. 9-5-2007-048660 186; dated Sep. 6, 2007.

* cited by examiner

MEMORY SYSTEMS, MODULES, CONTROLLERS AND METHODS USING DEDICATED DATA AND CONTROL BUSSES

CROSS REFERENCE TO RELATED APPLICATION

This application claims priority under 35 USC § 119 to Korean Patent Application No. 10-2005-0039008, filed on May 10, 2005, the disclosure of which is herein incorporated by reference in its entirety.

BACKGROUND OF THE INVENTION

The present invention relates to memory devices and methods of operation thereof and, more particularly, to memory module systems and methods of operation thereof.

Conventional memory devices used in personal computers, notebook computers and other devices are typically organized in a modular fashion. In particular, a desktop or notebook computer may include one or more memory modules, each of which includes a plurality of memory device chips mounted on a circuit substrate (e.g. a printed circuit board) that further includes a connector configured to mate with bus connector on the computer's motherboard. Conventional memory modules may have a variety of different configurations, such as UDIMM (Unbuffered Dual In-line Memory Module), RDIMM (Registered Dual In-line Memory Module) and FBDIMM (Fully Buffered Dual In-line Memory Module).

Figure 1:
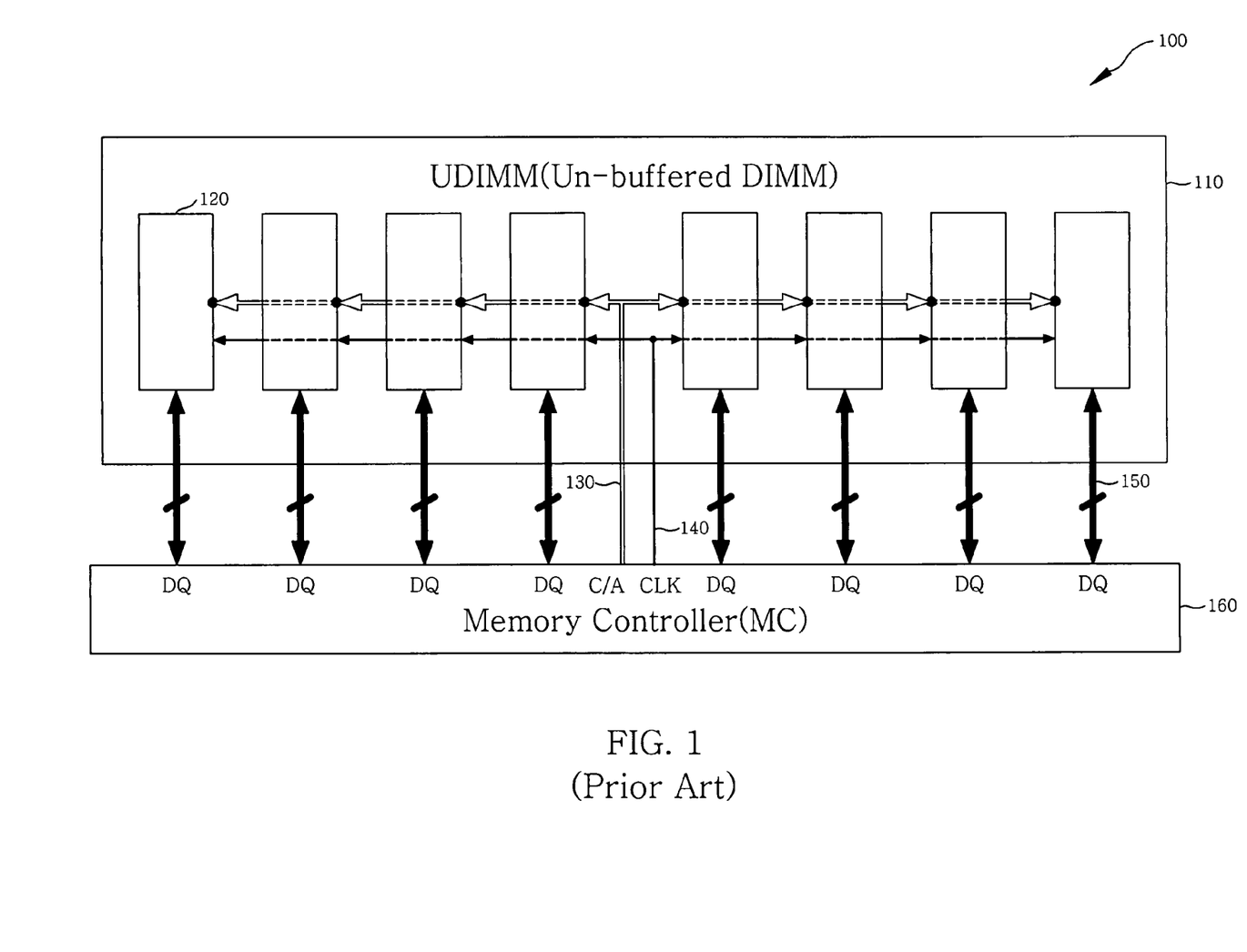
FIG. 1 is a schematic diagram illustrating a conventional UDIMM.

FIG. 1 illustrates a conventional UDIMM 100. The UDIMM 100 includes a circuit substrate 110 and a plurality of memory devices 120 disposed thereon. The memory devices 120 are controlled by a memory controller 160 external to the UDIMM 100. As shown, the memory controller 150 and each of the memory devices 120 may be coupled in common to a control/address (C/A) bus 130 and a clock line 140, while respective bidirectional data busses 150 extend between the respective memory devices 120 and the memory controller 160. In such an arrangement, more memory devices are coupled to the C/A bus 130 and the clock bus 140 than to the data busses 150. Consequently, the C/A bus 130 and the clock bus 140 may have a greater loading than the data busses 150.

Figure 2:
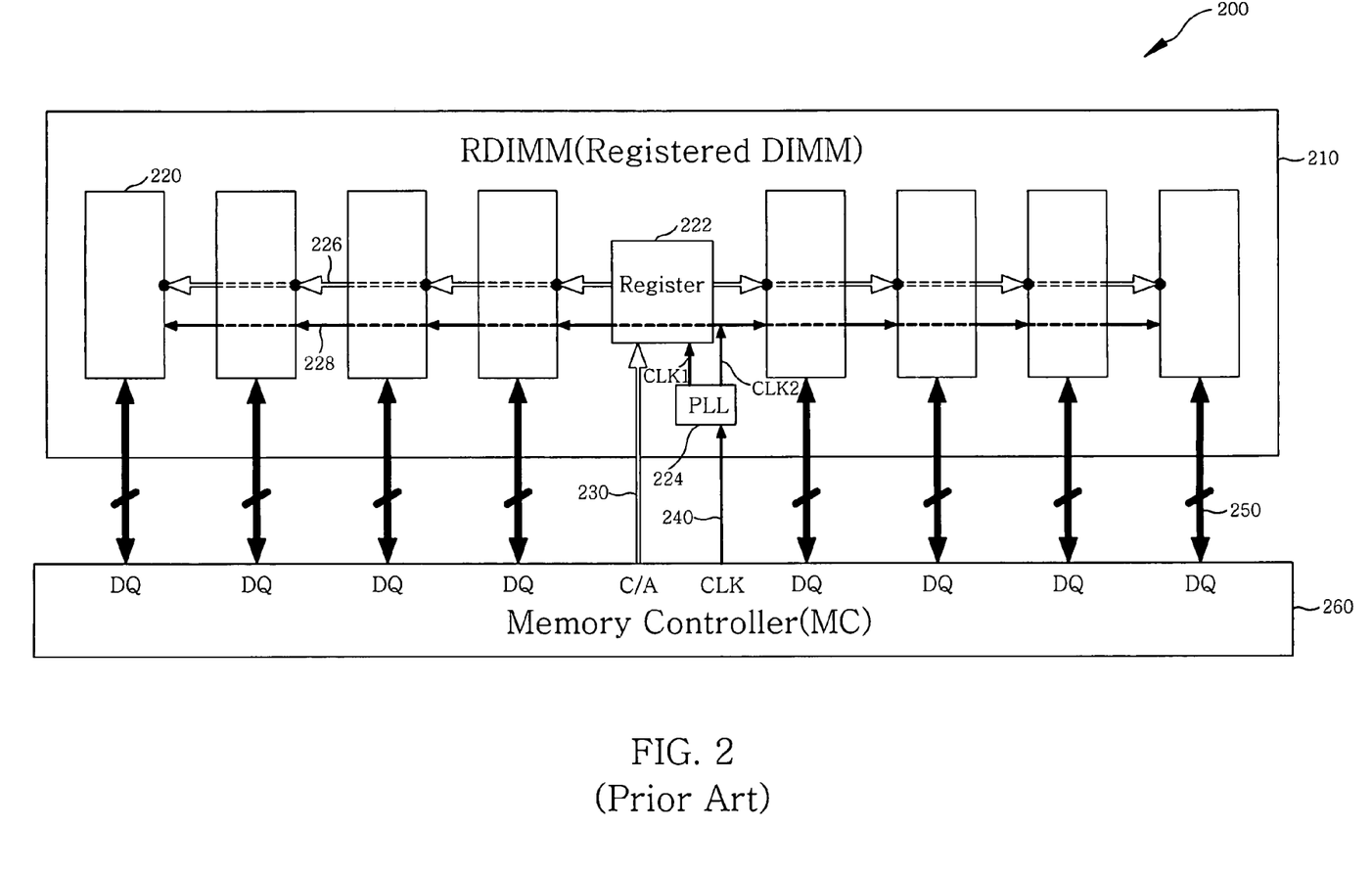
FIG. 2 is a schematic diagram illustrating a conventional RDIMM.

One conventional technique to reduce control/address line loading between a memory controller and memory module is to provide point-to-point links between a memory controller and memory modules by buffering C/A, clock and/or data signals on the memory modules. For example, FIG. 2 illustrates a conventional RDIMM 200 that provides clock and C/A signal buffering. The RDIMM 200 includes a plurality of memory devices 220, a C/A buffer 222, and a clock buffer (e.g., a phase-locked loop circuit) 224 disposed on a circuit substrate 210. Respective data busses 250 extend between respective ones of the memory devices 220 and an external memory controller 260, similar to a UDIMM. A single C/A bus 230 extends between the memory controller 260 and the C/A buffer 222. A C/A sub-bus 226 on the module 200 couples the C/A buffer 222 and the memory devices 220. Similarly, a single clock bus 240 extends between the memory controller 260 and the clock buffer 224, and a clock sub-bus 228 couples the clock buffer 224 to the memory devices 220. In such an arrangement, the loading of the data busses 250, the C/A bus 230 and the clock bus 240 may be roughly equivalent, but the sub-busses 226, 228 of the module 200 may have relatively higher loading in comparison to the data busses 250. In an FBDIMM, data may be similarly buffered.

Memory architectures employing high-speed serial communications between memory modules and a memory controller have recently been developed. For example, the Advanced Memory Buffer (AMB) memory architecture employs high-speed serial communications links that connect a memory controller to a plurality of FBDIMMs in a cascaded arrangement. Typically, each of the FBDIMMs is configured to pass data and control signals downstream (away from the memory controller) and upstream (towards the memory controller). The use of high-speed serial links can reduce the number of signal lines required to link a memory module to a memory controller, which can simplify circuit board wiring and/or increase performance. U.S. Pat. No. 6,502,161 to Perego et al. describes a buffered memory system topology in which a point-to-point link between a master and one or more memory subsystems. Each subsystem includes a buffer device that mediates between the master and memory devices of the subsystem, and respective groups of memory devices may be coupled to the buffer device by respective channels that each include control lines, data lines and clock lines.

SUMMARY OF THE INVENTION

In some embodiments of the present invention, a memory system includes a plurality of memory devices arranged in sets on at least one memory module, each set including at least one memory device. The system further includes respective dedicated serial data and control busses configured to couple respective ones of the memory device sets directly to a memory controller external to the at least one memory module. The dedicated serial data and control busses may be configured to provide unbuffered access to the individual memory devices from the memory controller.

The at least one memory module may include a plurality of memory modules, and the memory device sets may each include devices from multiple ones of the modules. Each memory device may include a packet decoder coupled to the associated control bus and configured to decode address and/or command data from packets received over the control bus. The system may further include respective clock lines configured to couple respective ones of the memory device sets to the memory controller. The data and control busses may include differential or single-ended busses. The control busses may be configured to transport address and/or command information. Each control bus may include more than one serial bus. The data busses may be bidirectional or unidirectional.

According to further embodiments of the present invention, a memory system includes a plurality of memory devices arranged in sets on at least one memory module, each set including at least one memory device and respective dedicated serial data and control busses and configured to couple respective ones of the memory device sets to a memory controller external to the at least one memory module, wherein the dedicated data and control busses have the same net topology. The same number of the memory devices may be coupled to each of the dedicated data and/or control busses. The memory device sets may include single or multiple memory devices.

In additional embodiments of the present invention, a memory module includes a plurality of memory devices arranged in sets, each set including at least one memory device and respective dedicated pairs of serial data and control busses configured to couple respective ones of the sets of memory devices to an external memory controller. Each set may include a single memory device or multiple memory devices. The data and control busses in each of the dedicated pairs may have the same net topology. The data and control busses of each of the dedicated pairs may be connected to the same number of memory devices.

Further embodiments of the present invention provide a memory module including a plurality of memory devices arranged in sets, each of the sets including at least one memory device. The memory module further includes a memory control buffer, respective dedicated serial control busses coupling respective ones of the memory device sets to the memory control buffer and respective dedicated serial data busses configured to couple respective ones of the memory device sets to an external memory controller. Each set may include a single memory device or multiple memory devices. The data and control busses in each of the dedicated pairs may have the same net topology. The data and control busses of each of the dedicated pairs may be connected to the same number of memory devices.

In still further embodiments of the present invention, a memory controller include a bus interface configured to be coupled to respective sets of memory devices on one or more memory modules by respective dedicated serial data and serial control busses. Each set may include a single memory device or multiple memory devices. Each of the dedicated data and control busses may have the same net topology. Each of the dedicated data and control busses may connect the memory controller to the same number of memory devices. The data busses may be unidirectional or bidirectional.

Additional embodiments of the present invention provide methods of operating a plurality of memory devices on at least one memory module. Respective sets of the memory devices are directly coupled to a memory controller external to the at least one memory module using respective dedicated serial data busses and serial control busses. Data and control signals are provided over the respective dedicated serial data and serial control busses. Direct coupling respective sets of the memory devices to a memory controller external to the at least one memory module using respective dedicated serial data busses and serial control busses may include coupling respective sets of the memory devices to the memory controller using respective dedicated pairs of serial data and serial control busses. Control signals between the memory devices and the memory controller may be buffered via respective memory control buffers on the at least one memory module.

DETAILED DESCRIPTION OF EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes or configurations of elements may be idealized or exaggerated for clarity.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third etc. may be used herein to describe various elements, components and/or sections, these elements, components and/or sections should not be limited by these terms. These terms are only used to distinguish one element, component, or section from another element, region or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention arise from a realization that substantially balanced loading of data and control (e.g., command/address) lines in a memory architecture may be achieved by using respective dedicated pairs of serial data and control (e.g., command/address) busses to couple respective memory devices or groups of memory devices of a memory module (e.g., a UDIMM, RDIMM or FBDIMM) to a memory control circuit (e.g., an external memory controller and/or buffer circuitry on the module), such that the serial data and control busses connected to a given memory device or group of memory devices each have the same net topology, e.g., their signal paths (e.g., single-ended signal lines and/or differential signal line pairs) have the same number of loads connected thereto. Thus, in some embodiments, relatively simple and/or less expensive UDIMM configurations may be used to achieve balanced loading of memory controller to module connections, similar to that provided by more complex point-to-point buffered solutions, without using inordinately large numbers of signal lines. In additional embodiments, performance characteristics of buffered solutions may also be improved.

As used herein, a "control bus" is a bus configured to convey memory command signals, such as strobe signals (e.g., CAS, RAS, and the like), enable signals (e.g., WE, RE, and the like), and address signals. A "data bus" is a bus configured to carry data to be stored in memory locations and/or data retrieved from memory locations. Control and/or data busses may be unidirectional or bidirectional, and may be single-ended or differential. It will be appreciated that, as used herein, a "bus" may include multiple signal paths, e.g., multiple data channels and/or multiple control channels.

Figure 3:
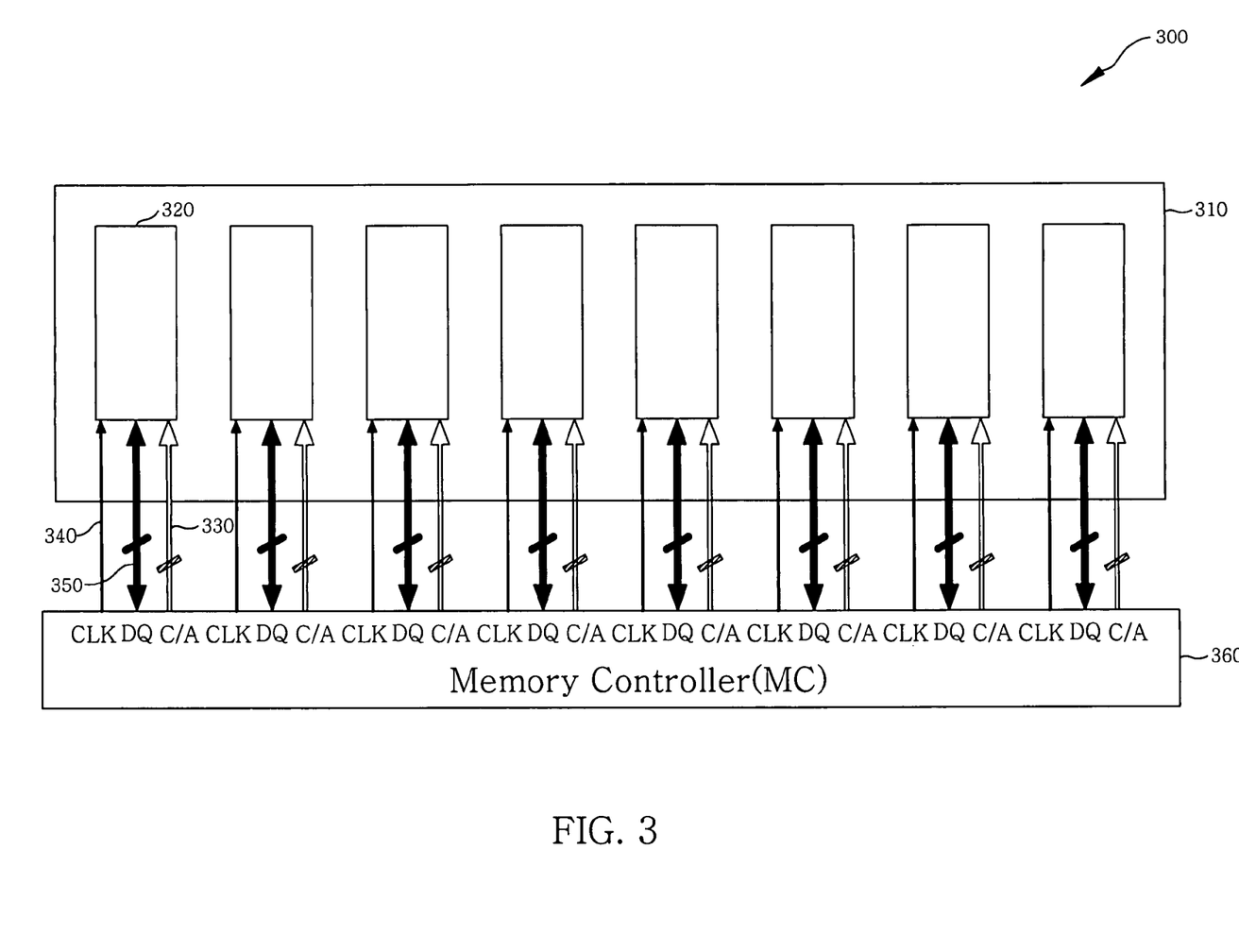
FIG. 3 is a schematic diagram illustrating a UDIMM and memory controller according to some embodiments of the present invention.

FIG. 3 illustrates a UDIMM 300 and memory controller 360 according to some embodiments of the present invention. The UDIMM 300 includes a circuit substrate 310 (e.g., a printed circuit board), upon which a plurality of memory devices 320 is disposed. Respective ones of the memory devices 320 are coupled to the memory controller 360 by respective serial data busses 350, clock busses 340 and serial control/address (C/A) busses 330. Thus, the respective memory devices 320 have respective dedicated pairs of data and control busses connected thereto. It will be appreciated that a respective dedicated clock bus may be provided with the respective dedicated pairs of data and control busses, as shown, or that a common clock or other clock signal arrangement may be used.

Figure 4:
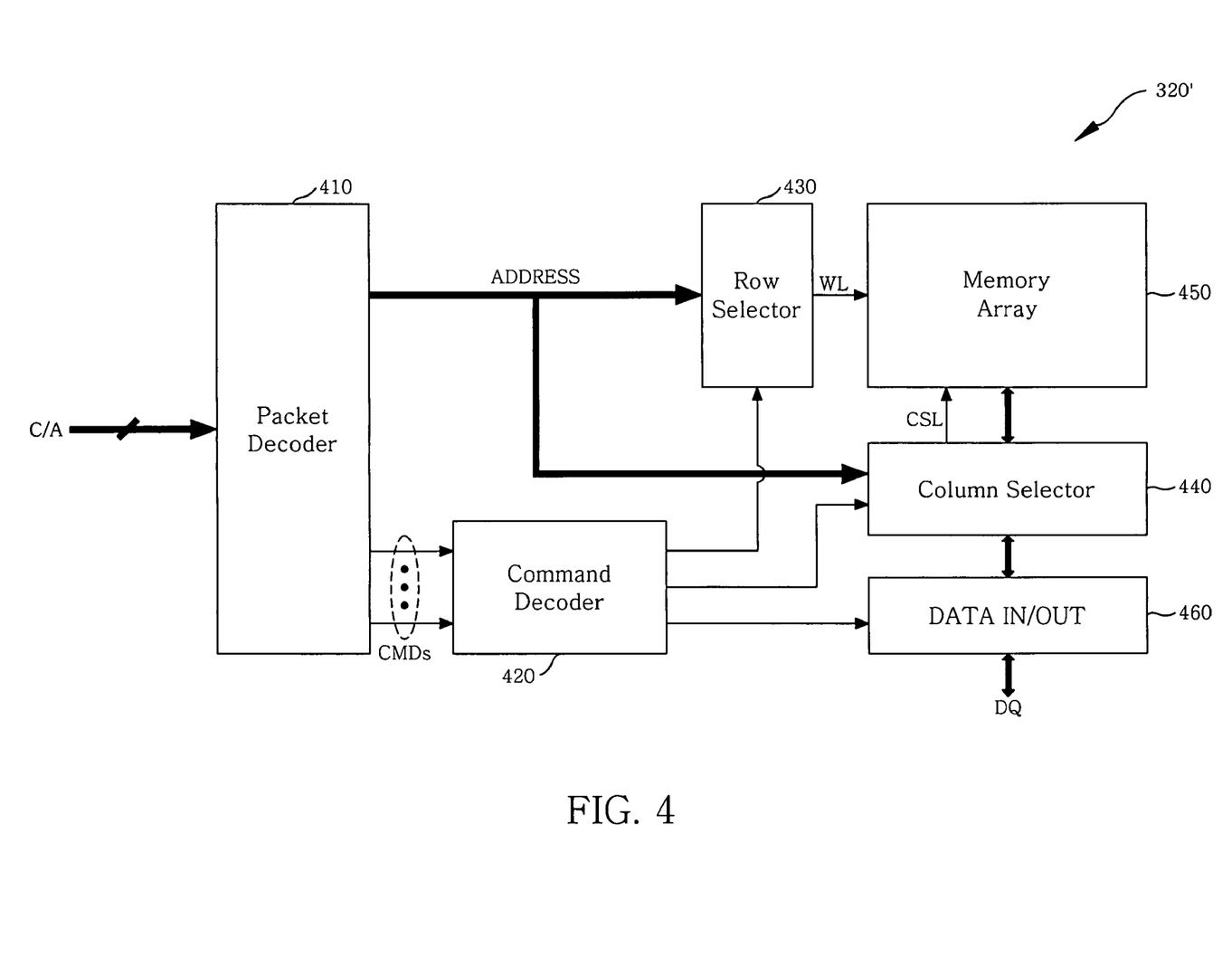
FIG. 4 is a schematic diagram illustrating a memory device according to further embodiments of the present invention.

In some embodiments of the present invention, control information (e.g., command and address information) may be transmitted over a C/A bus in a packet form, i.e., as streams of packets that include control and address information as a payload. FIG. 4 illustrates an exemplary configuration for a memory device 320' having such a packet C/A interface that may be used in the memory module 300 of FIG. 3 according to some embodiments of the present invention. The memory device 320' includes a packet decoder 410 that is configured to received C/A signal packets, e.g., from a serial C/A bus, such as the serial C/A bus 330 of FIG. 3. The packet decoder 410 parses the received C/A packets to recover commands CMDs and addresses ADDRESS therefrom, which are used in reading and/or writing to a memory array 450. The addresses ADDRESS are provided to the row selector 430 and to the column selector 440, while the commands CMDs are provided to a command decoder 420. The command decoder 420 responsively generates control signals for the row selector 430, which generates word line signals WL, the column selector 440 (which responsively generates column select signals CSL for the array 450), and a data input/output circuit 460, which sends and receives data over a data bus DQ.

Figure 5:
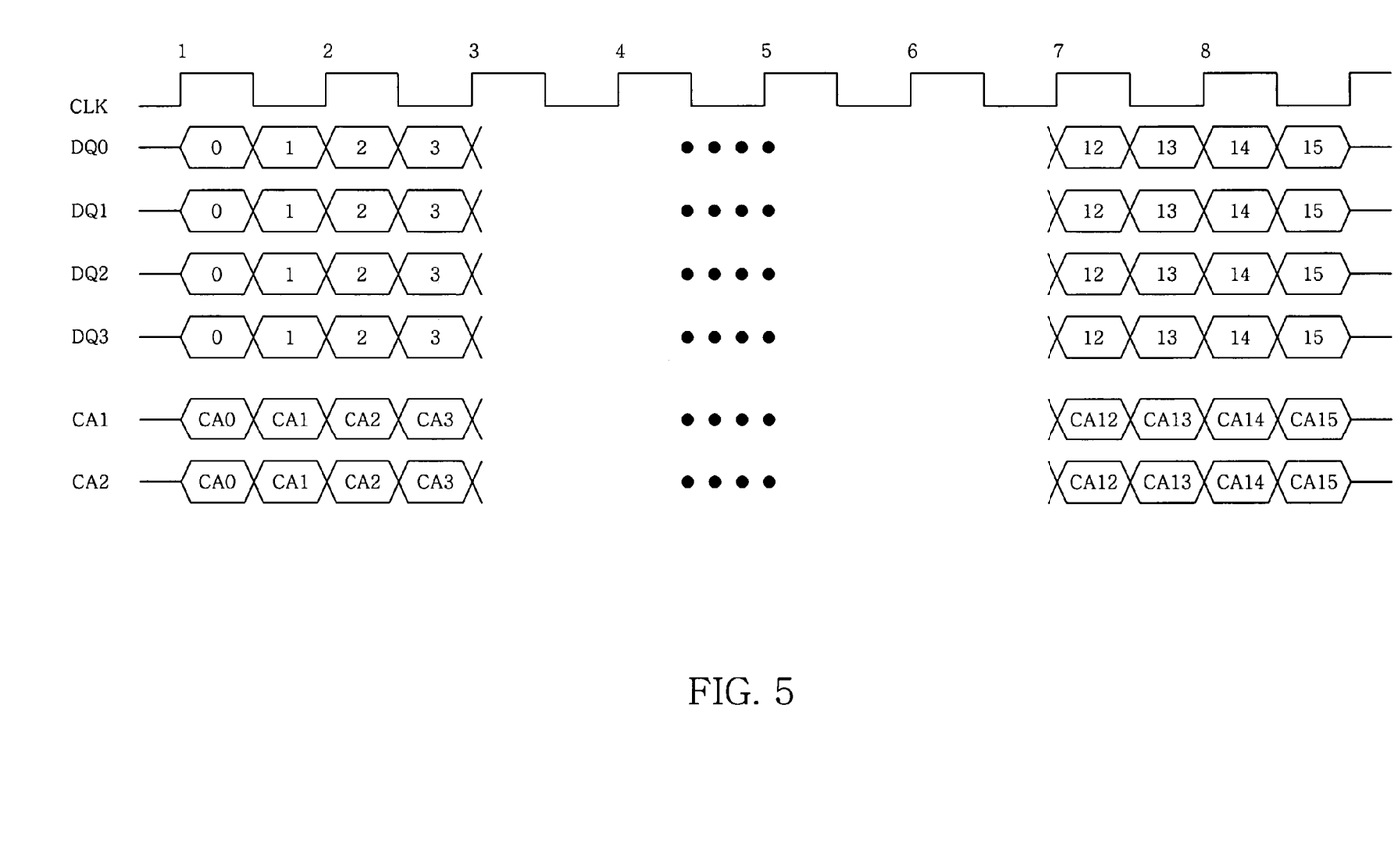
FIG. 5 is a timing diagram illustrating exemplary operations of the UDIMM of FIG. 3 according to further embodiments of the present invention.

According to embodiments of the invention, a dedicated serial data or C/A bus, such as the data and C/A serial busses 350, 330 of FIG. 3, may be provided for each memory device or set of memory devices on a memory module. The number of signal paths (or channels) of such serial bussed may generally depend on factors such as the dimensionality of the memory (e.g., the number of address bits needed and/or the data width of the memory), the number of commands needed to execute read/write or others operations, and the like. FIG. 5 is a timing diagram illustrating exemplary operations according to further embodiments of the present invention of a memory device configured for use with dedicated serial data and C/A busses having multiple signal paths (e.g., multiple single-ended signal lines or multiple differential signal line pairs). For a read/write cycle having a burst length of 16 (assuming double data rate (DDR) operation), 16 bits are transmitted from a memory controller (e.g., the memory controller 360 of FIG. 3) over each of data paths DQ0-3 to a memory device (e.g., a memory device 320 of FIG. 3) in an interval corresponding to 8 periods of a corresponding clock signal CLK. Concurrently with the transfer of data, 16 corresponding C/A packets may be sent over each of C/A paths C/A1-2, such that at least 32 bits of C/A information is transferred to the memory device with the burst of data. It will be appreciated that if, for example, the burst length of the memory device is constrained to be higher than 16 (e.g., 32), it may be possible to transmit sufficient C/A bits with a single signal path, while, if the burst length is allowed to be less than 16, additional dedicated C/A signal paths may be used. Generally, "serial" or "packetized" communication over the C/A busses means that the number of command/address signals is greater than the number of C/A signal paths.

The configuration shown in FIG. 3 involves the provision of a dedicated pair including a serial data bus 350 and a serial C/A bus 330 (and, optionally, a dedicated clock bus 340) for each memory device 320 of a UDIMM 300, such that the data and address busses have the same net topology, i.e., their signal paths have the same number of devices connected thereto. This can provide substantially equivalent capacitive loading of the data busses and the C/A busses, such that the data and C/A busses may support substantially the same bit rate, thus providing benefits comparable to those provided by AMB and other conventional point-to-point buffered solutions while using relatively simple UDIMM modules.

Figure 6:
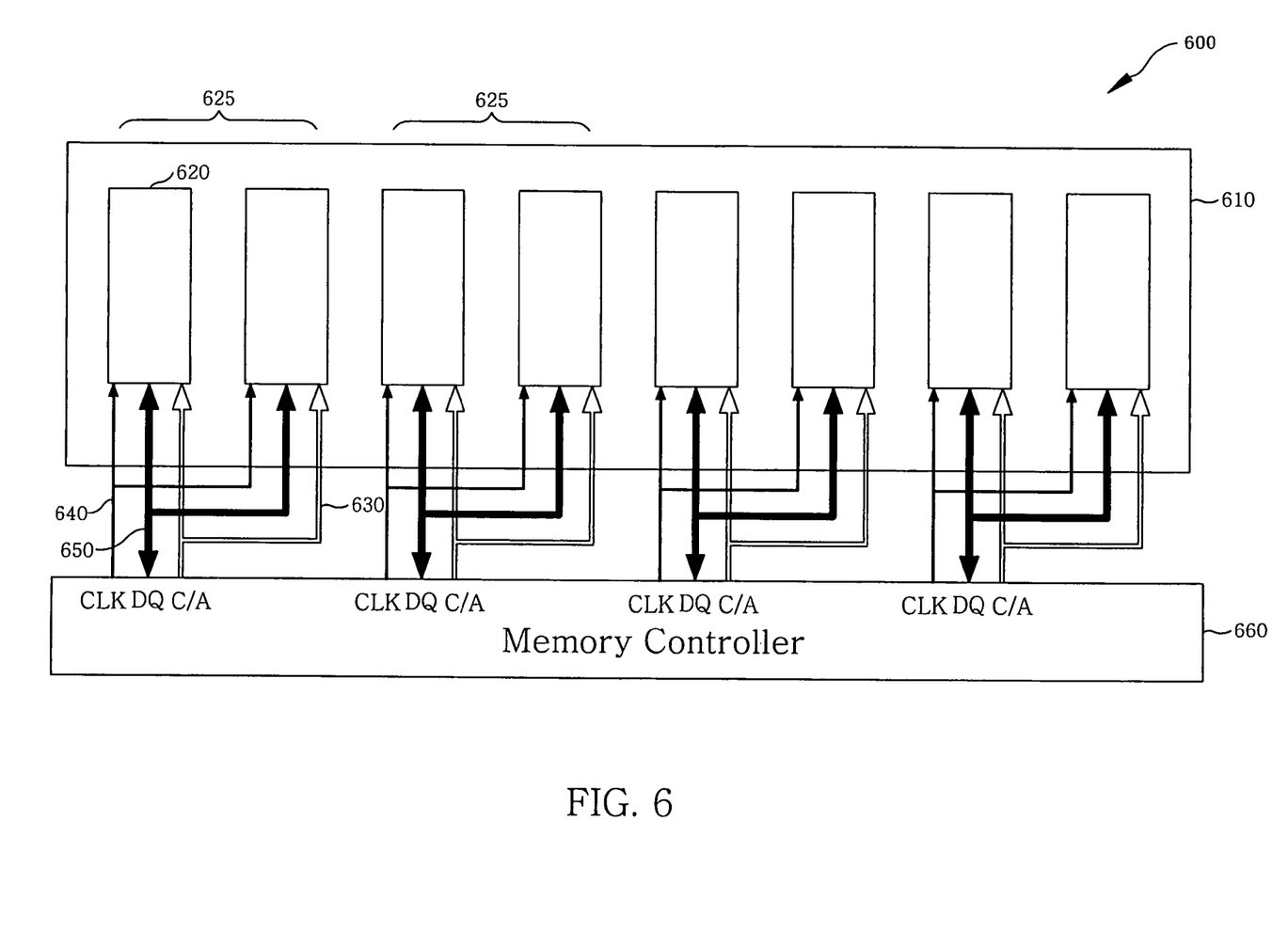
FIG. 6 is a schematic diagram of a UDIMM and memory controller according to additional embodiments of the present invention.

According to further embodiments of the present invention, such an approach may be further generalized to the provision of dedicated pairs of serial data and C/A busses to respective groups including plural memory devices. For example, FIG. 6 illustrates a UDIMM 600 including groups 625 of memory devices 620 disposed on a substrate 610. Respective ones of the groups 625 of memory devices 620 are coupled to a memory controller 660 by respective dedicated pairs of serial data busses 650 and serial C/A busses 630 (along with dedicated clock busses 640). Accordingly, the data busses 650 and the C/A busses 630 have the same net topology.

Figure 7:
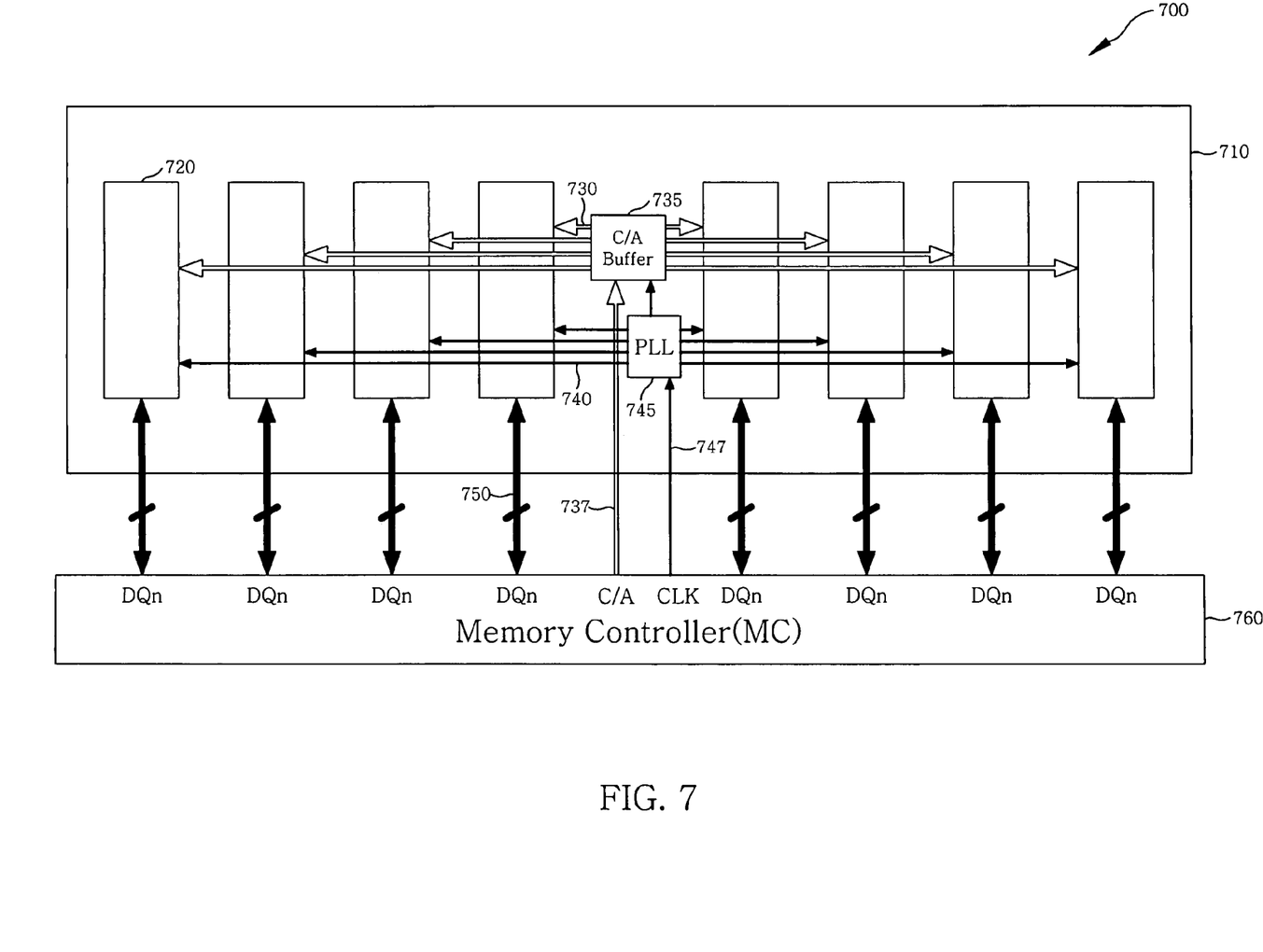
FIG. 7 is a schematic diagram of an RDIMM and memory controller according to additional embodiments of the present invention.

The present invention is also applicable to RDIMM and FBDIMM. FIG. 7 illustrates an RDIMM 700 and associated memory controller 760. The RDIMM 700 includes a plurality of memory devices 720 disposed on a circuit substrate 710 and configured to be coupled to the memory controller 760 by respective data busses 750. The RDIMM 700 further includes a C/A buffer 735 and a clock buffer, here, a phase locked loop (PLL) 745, configured to be coupled to the memory controller 760 by a C/A bus 737 and a clock bus 747, respectively. Respective ones of the memory devices 720 are coupled to the C/A buffer 735 by respective C/A busses 730, such that each memory device 720 is served by a dedicated pair including a serial data bus 750 and a serial C/A bus 730. As shown, dedicated clock busses 740 are also provided from the PLL 745 to the respective memory devices 720. It will be appreciated that, similar to the arrangement shown in FIG. 7, a RDIMM could also be arranged such that respective groups of multiple memory devices are served by respective dedicated pairs of data and C/A (control) busses.

Figure 8:
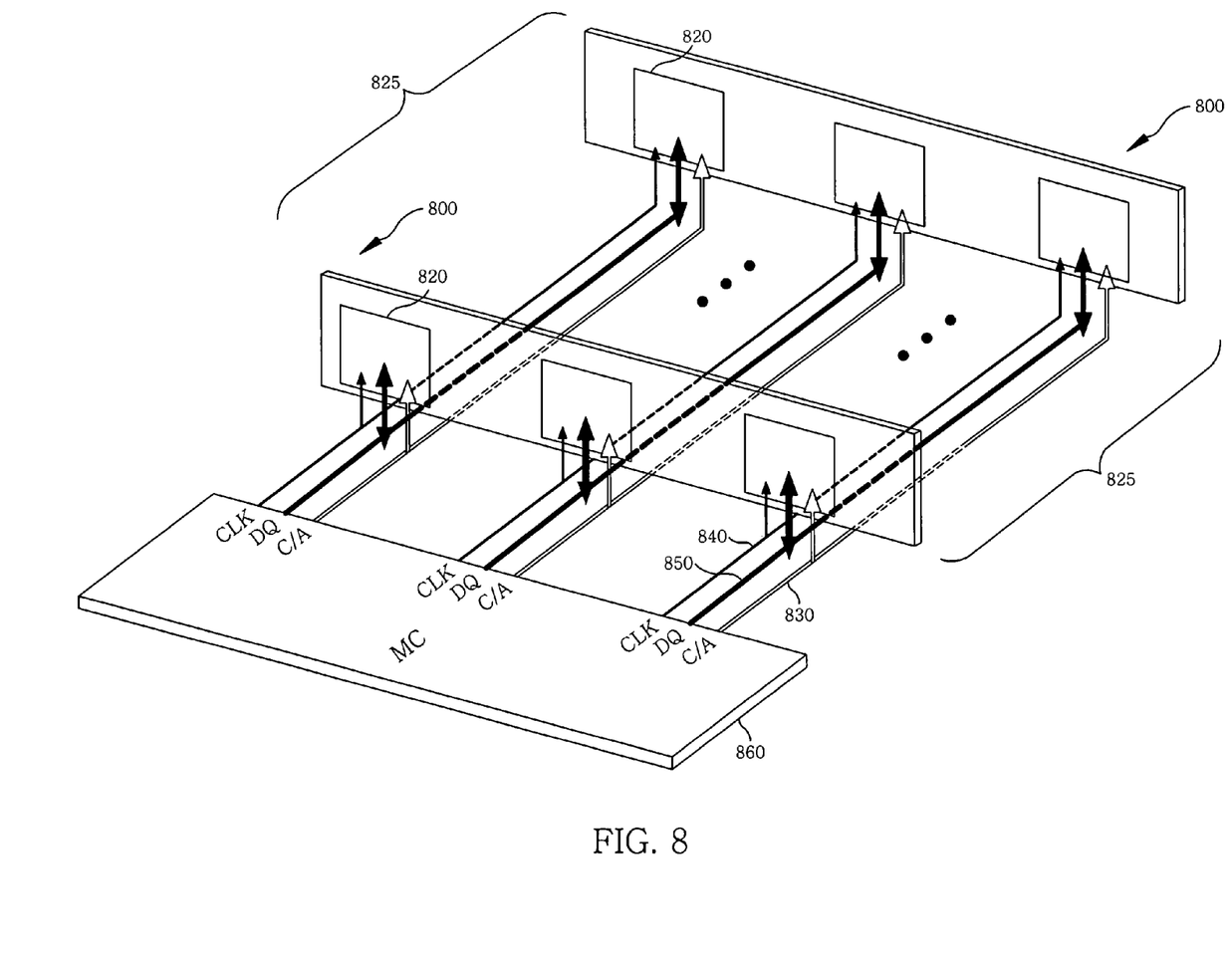
FIGS. 8 and 9 are schematic diagrams illustrating an arrangement of multiple UDIMMs and memory controller according to further embodiments of the present invention.
Figure 9:
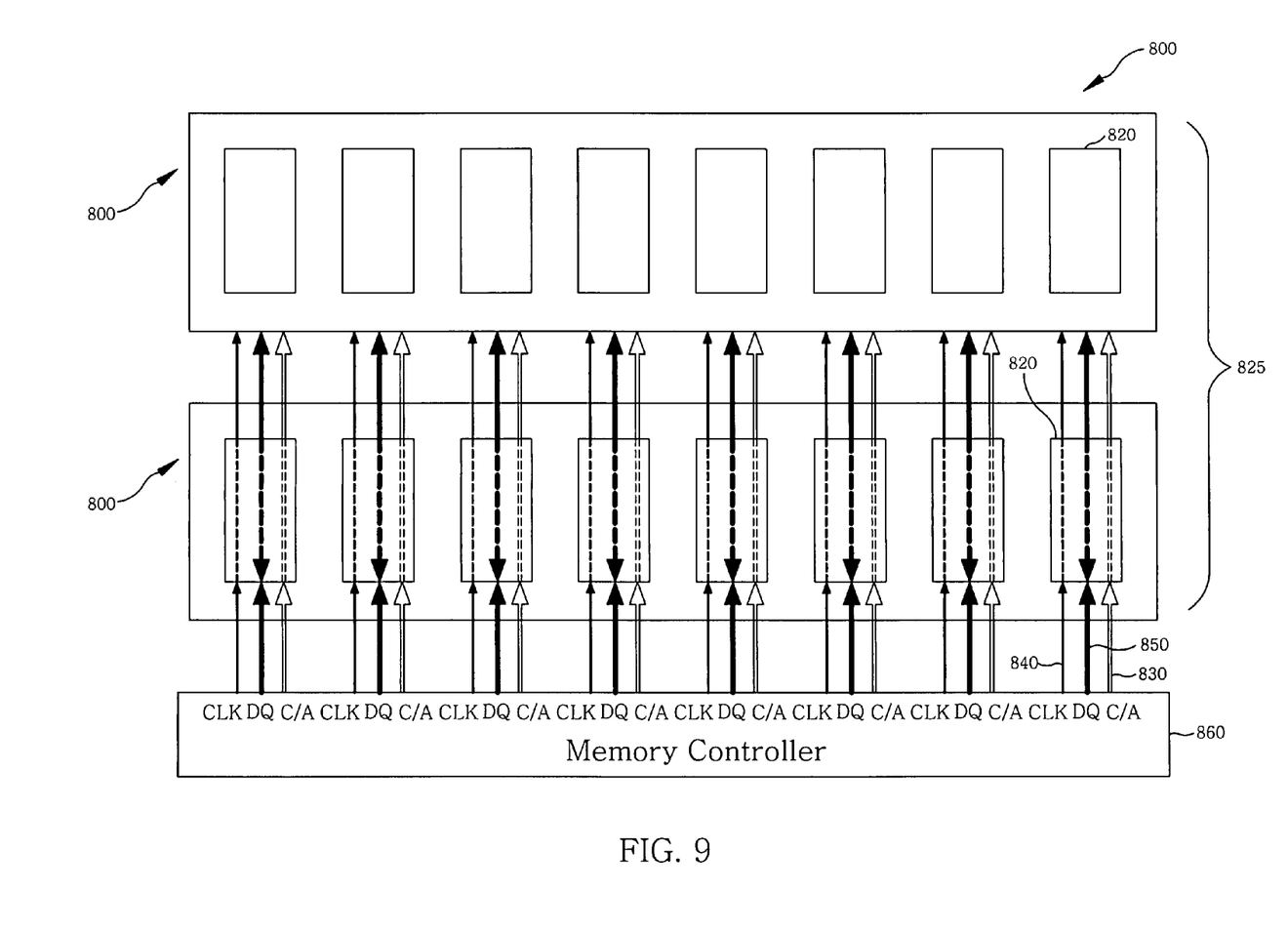

According to further embodiments of the present invention, respective groups of sets of memory devices including devices from multiple modules may be coupled to memory control circuitry (e.g., a memory controller external to the modules) by respective dedicated pairs of data and control busses. For example, in a memory module/memory controller configuration according to some embodiments of the present invention illustrated in FIGS. 8 and 9, a memory controller 860 may be configured to be coupled to multiple sets 825 of memory devices 820 of multiple UDIMMs 800 by respective data, C/A and clock busses 850, 830, 840. Each set 825 of memory devices 820 may include devices from multiple UDIMMs 800, with respective ones of the sets 825 being served by respective dedicated pairs of data and C/A busses 850, 830.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A memory system, comprising:
   at least one memory module comprising a plurality of memory devices;
   a memory controller; and
   a plurality of bus pairs, each of the bus pairs comprising a serial data bus and a serial control bus, respective ones of the bus pairs configured to directly couple respective ones of the memory devices to the memory controller,
   wherein the number of bus pairs and the number of the memory devices of each of the at least one memory module are the same, and
   wherein each memory device comprises a packet decoder coupled to the associated control bus and configured to decode address and/or command data from packets received over the control bus.

2. The system of claim 1, wherein the bus pairs are configured to provide unbuffered access to the individual memory devices from the memory controller.

3. The system of claim 1, wherein the at least one memory module comprises a plurality of memory modules, and wherein the bus pairs are coupled to devices from multiple ones of the plurality of memory modules.

4. The system of claim 1, further comprising respective clock lines configured to couple respective ones of the memory devices to the memory controller.

5. The system of claim 1, wherein each control bus comprises more than one signal path.

6. A memory module comprising:
   a plurality of memory devices;
   a memory control buffer;
   a plurality of serial control busses configured to directly couple respective ones of the memory devices to the memory control buffer; and
   a plurality of serial data busses configured to directly couple respective ones of the memory devices to an external memory controllers;
   wherein the data busses are connected to the same number of memory devices and wherein the control busses are connected to the same number of memory devices.

7. The module of claim 6, wherein the data busses have the same net topology and wherein the control busses have the same net topology.

* * * * *